US009447217B2

United States Patent
Highgate

(10) Patent No.: US 9,447,217 B2
(45) Date of Patent: Sep. 20, 2016

(54) METHOD FOR PRODUCING A MEMBRANE ELECTRODE INCLUDING FORMING THE MEMBRANE IN SITU

(75) Inventor: Donald James Highgate, Surrey (GB)

(73) Assignee: ITM POWER (RESEARCH) LIMITED, South Yorkshire (GB)

( * ) Notice: Subject to any disclaimer, the term of this patent is extended or adjusted under 35 U.S.C. 154(b) by 0 days.

(21) Appl. No.: 11/957,075

(22) Filed: Dec. 14, 2007

(65) Prior Publication Data

US 2008/0095925 A1 Apr. 24, 2008

Related U.S. Application Data

(62) Division of application No. 10/236,655, filed on Sep. 6, 2002, now Pat. No. 7,318,972.

(30) Foreign Application Priority Data

| Sep. 7, 2001 | (GB) | .................................. 0121714.0 |
| Jan. 9, 2002 | (GB) | .................................. 0200421.6 |
| Jan. 9, 2002 | (GB) | .................................. 0200422.4 |

(51) Int. Cl.
*H01M 6/00* (2006.01)
*C08F 220/44* (2006.01)
(Continued)

(52) U.S. Cl.
CPC ......... *C08F 220/44* (2013.01); *B01D 67/0006* (2013.01); *B01D 67/0088* (2013.01);
(Continued)

(58) Field of Classification Search
CPC ......... H01M 8/0291; H01M 8/04291; H01M 8/1004; H01M 8/1027; H01M 8/103; H01M 8/1072; B01D 67/0006; B01D 67/0088; B01D 71/40; B01D 71/42; B01D 71/44; C08J 5/2231; C08J 5/2243; Y02E 60/521
See application file for complete search history.

(56) References Cited

U.S. PATENT DOCUMENTS

| 4,036,788 A | 7/1977 | Steckler |
| 4,326,958 A | 4/1982 | Kawahara et al. |

(Continued)

FOREIGN PATENT DOCUMENTS

| CN | 1269429 A | 10/2000 |
| EP | 0 827 228 | 3/1998 |

(Continued)

OTHER PUBLICATIONS

Buchi, Felix N. Gupta, Bhuvanesh. Haas, Otto. Scherer, Gunther G. "Study of Radiation-Grafted FEP-g-Polystyrene Membranes as Polymer Electrolytes in Fuel Cells." 1995 Electrochimica Acta No. 3 p. 345-353.*

(Continued)

*Primary Examiner* — Raymond Alejandro
(74) *Attorney, Agent, or Firm* — Saliwanchik, Lloyd & Eisenschenk

(57) ABSTRACT

A hydrophilic cross-linked polymer obtainable by copolymerisation of hydrophobic and hydrophilic monomers that give a cross-linked hydrophilic polymer on polymerisation; a monomer including a strongly ionic group; and water is useful as the membrane in an assembly that can be used in an electrolyter or fuel cell.
More generally, a membrane electrode assembly comprises electrodes and an ion-exchange membrane which comprises a hydrophilic polymer including a strongly ionic group.
A method for producing a membrane electrode assembly comprising electrodes and an ion-exchange membrane, comprises introducing between the electrodes a material or materials from which the membrane can be formed, and forming the membrane in situ.

13 Claims, 7 Drawing Sheets

(51) Int. Cl.
| | |
|---|---|
| B01D 67/00 | (2006.01) |
| B01D 71/40 | (2006.01) |
| B01D 71/42 | (2006.01) |
| B01D 71/44 | (2006.01) |
| C08F 220/40 | (2006.01) |
| C08F 220/58 | (2006.01) |
| C08F 226/08 | (2006.01) |
| C08F 226/10 | (2006.01) |
| C08J 5/22 | (2006.01) |
| C25B 9/10 | (2006.01) |
| H01B 1/12 | (2006.01) |
| H01M 8/02 | (2016.01) |
| H01M 8/04 | (2016.01) |
| H01M 8/10 | (2016.01) |
| H01M 8/18 | (2006.01) |

(52) U.S. Cl.
CPC ............ B01D71/40 (2013.01); B01D 71/42 (2013.01); B01D 71/44 (2013.01); C08F 220/40 (2013.01); C08F 220/58 (2013.01); C08F 226/08 (2013.01); C08F 226/10 (2013.01); C08J 5/2231 (2013.01); C08J 5/2243 (2013.01); C25B 9/10 (2013.01); H01B 1/122 (2013.01); H01M 8/0291 (2013.01); H01M 8/04291 (2013.01); H01M 8/103 (2013.01); H01M 8/1004 (2013.01); H01M 8/1027 (2013.01); H01M 8/1072 (2013.01); B01D 2323/30 (2013.01); B01D 2323/34 (2013.01); B01D 2323/40 (2013.01); B01D 2325/10 (2013.01); B01D 2325/14 (2013.01); B01D 2325/16 (2013.01); B01D 2325/26 (2013.01); B01D 2325/36 (2013.01); B01D 2325/42 (2013.01); C08J 2333/20 (2013.01); C08J 2339/06 (2013.01); H01M 8/186 (2013.01); H01M 2300/0082 (2013.01); Y02E 60/521 (2013.01); Y02P 70/56 (2015.11)

(56) References Cited

U.S. PATENT DOCUMENTS

| | | | | |
|---|---|---|---|---|
| 5,223,353 | A * | 6/1993 | Ohsawa et al. | 429/307 |
| 5,403,462 | A * | 4/1995 | Lev et al. | 204/403.15 |
| 5,597,661 | A * | 1/1997 | Takeuchi et al. | 429/314 |
| 5,643,689 | A * | 7/1997 | Fleischer et al. | 429/487 |
| 5,643,968 | A * | 7/1997 | Andreola et al. | 521/27 |
| 5,814,372 | A * | 9/1998 | Moya | 427/245 |
| 6,054,230 | A | 4/2000 | Kato | |
| 6,149,810 | A | 11/2000 | Gonzalez-Martin et al. | |
| 6,203,949 | B1 * | 3/2001 | Ehrlich | 429/304 |
| 6,395,325 | B1 | 5/2002 | Hedge et al. | |
| 6,444,367 | B1 * | 9/2002 | Kinn et al. | 429/250 |
| 7,773,291 | B2 * | 8/2010 | Smith | 359/321 |
| 2002/0045085 | A1 * | 4/2002 | Formato et al. | 429/33 |
| 2002/0102451 | A1 | 8/2002 | Acker et al. | |
| 2002/0150811 | A1 | 10/2002 | Chikano et al. | |
| 2003/0168404 | A1 * | 9/2003 | Mika et al. | 210/639 |

FOREIGN PATENT DOCUMENTS

| | | | | |
|---|---|---|---|---|
| EP | 1 085 051 A1 | 3/2001 | | |
| EP | 1 394 879 | 3/2004 | | |
| JP | 02221106 A * | 9/1990 | | C01B 13/32 |
| JP | 05109419 A * | 4/1993 | | C25B 11/04 |
| JP | 08-162132 | 6/1996 | | |
| JP | 09-199144 | 7/1997 | | |
| JP | 11-302410 | 11/1999 | | |
| JP | 11-310649 | 11/1999 | | |
| JP | 2000-119420 | 4/2000 | | |
| JP | 2000-277131 | 10/2000 | | |
| JP | 2001035509 A * | 2/2001 | | H01M 8/02 |
| JP | 2002-075406 | 3/2002 | | |
| WO | WO 98/22989 | 5/1998 | | |
| WO | WO 01/49824 A2 | 3/2001 | | |
| WO | WO 01/46283 A1 | 6/2001 | | |
| WO | WO 01/60872 A1 | 8/2001 | | |
| WO | WO 02/058205 | 7/2002 | | |
| WO | WO 02/087001 | 10/2002 | | |
| WO | WO 03/074597 A1 | 9/2003 | | |

OTHER PUBLICATIONS

Machine Translation for Honma et al., JP 2001-035509 A.*
Derwent Abstract for Honma et al., JP 2001-035509 A.*
Odian, George G. Principles of Polymerization. Wiley, 1991. eBook Collection (EBSCOhost). Web. Apr. 5, 2012. (Chapter 3, p. 198,199,202).*
Free Radical Vinyl Polymerization. University of Southern Mississippi. 2005. (http://www.pslc.ws/mactest/radical.htm). Retrieved Apr. 5, 2012.*
"Polymerization." Dictionary.com. Dictionary.com, n.d. Web. Sep. 26, 2012. <http://dictionary.reference.com/browse/polymerization?s=t>.*
"Illustrated Glossary of Organic Chemistry—Alkoxide." Illustrated Glossary of Organic Chemistry—Alkoxide. UCLA Department of Chemistry & Biochemistry, n.d. Web. Jul. 9, 2013.*
Sun et al., "Performance characteristics of lithium-ion cells using in-situ polymerized electrolytes", Journal of Power Sources 68 (1997) 352-356.*
Crisp, J.A. et al., "Development of Improved Membranes for Solid Polymer Fuel Cells," *Fifth Grove Fuel Cell Symposium: Fuel Cells—Investing in a Clean Future*, Sep. 22-25, 1997. Poster No. 50, London, UK.
Office Action for corresponding Canadian Application No. 2,459,340 dated Feb. 3, 2010.
Office Action for corresponding European Application No. 05077932.1 dated Jan. 27, 2010.
Office Action issued in corresponding Japanese Application No. 2008-26 2165 dated Mar. 6, 2012.

* cited by examiner

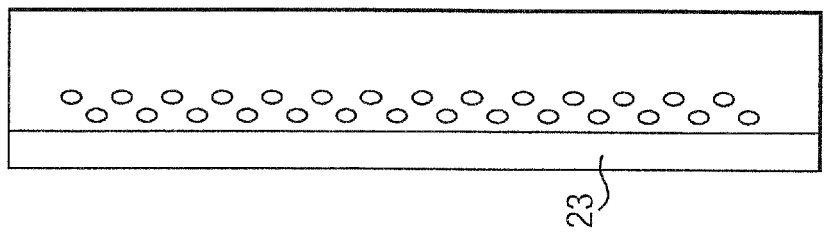
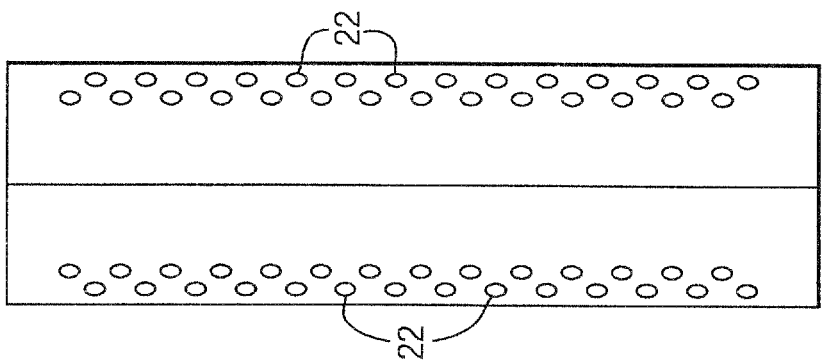
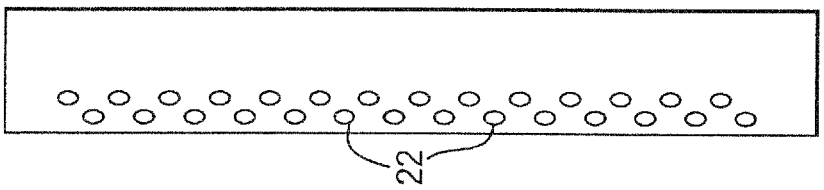
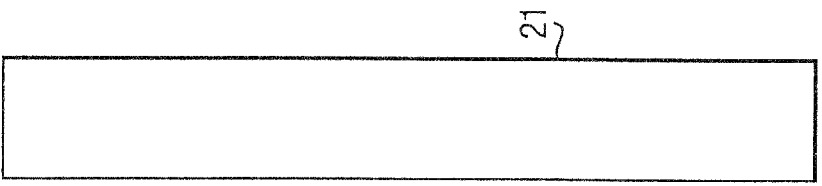

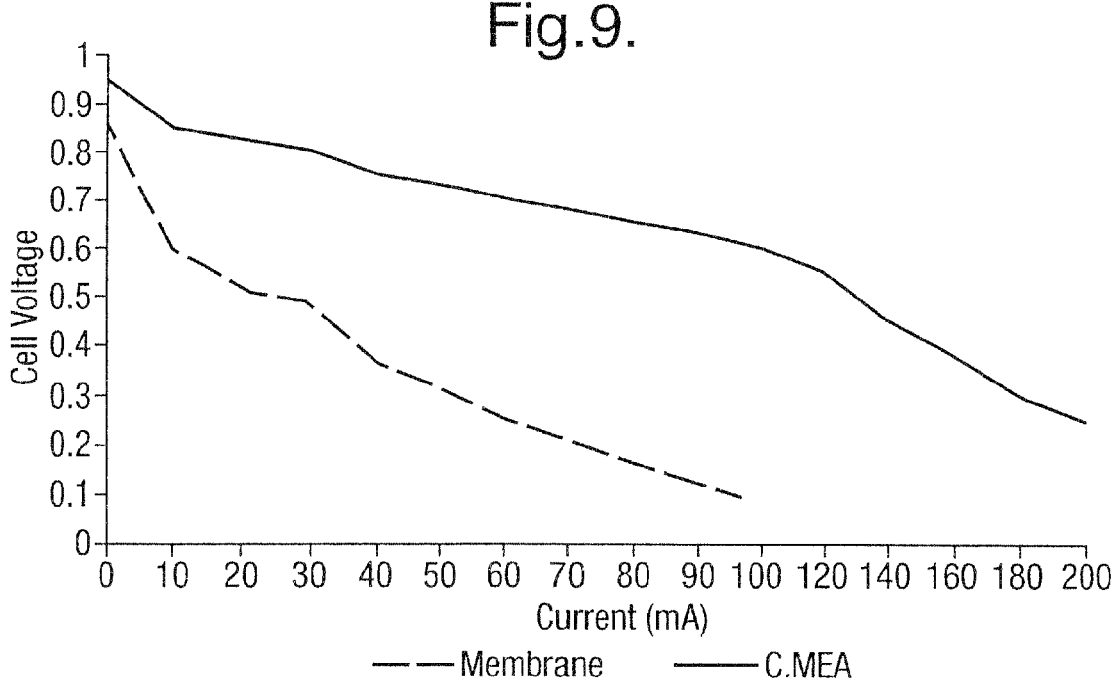
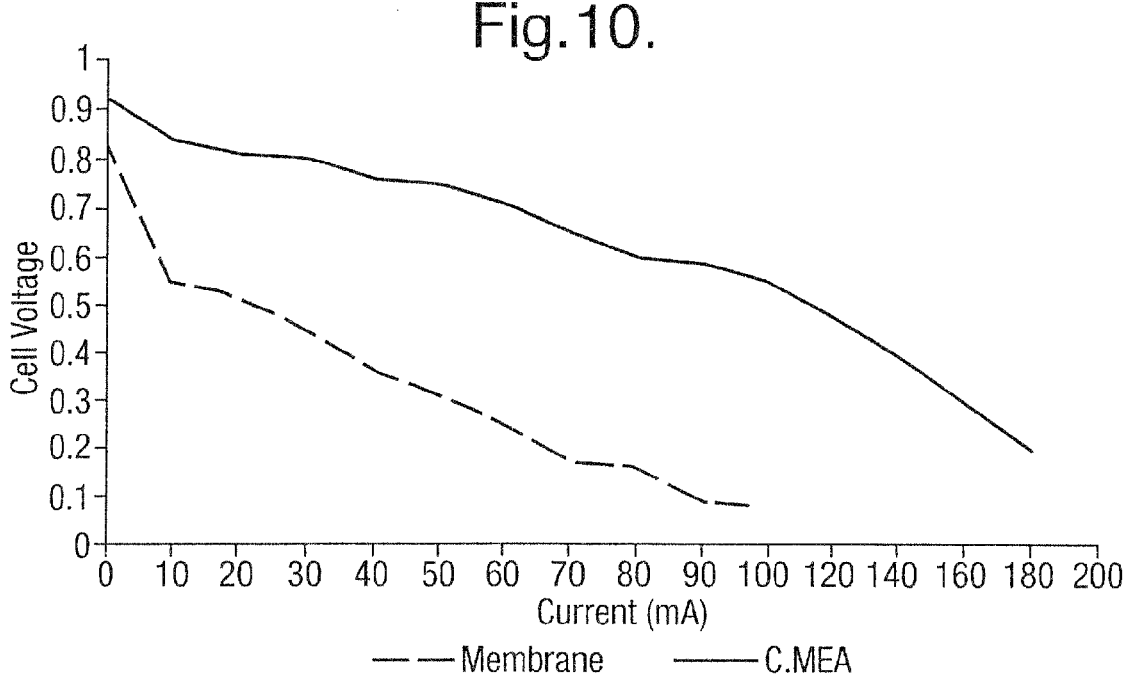

METHOD FOR PRODUCING A MEMBRANE ELECTRODE INCLUDING FORMING THE MEMBRANE IN SITU

CROSS-REFERENCE TO RELATED APPLICATIONS

This application is a divisional application of U.S. application Ser. No. 10/236,665, filed Sept. 6, 2002 now U.S. Pat. No. 7,318,972; which claims priority to Great Britain Application No. 0121714.0, filed Sept. 7, 2001; Great Britain Application No. 0200421.6, filed Jan. 9, 2002; and Great Britain Application No. 0200422.4, filed Jan. 9, 2002, which are hereby incorporated by reference in their entireties.

FIELD OF THE INVENTION

This invention relates to hydrophilic polymers that are electrically conducting and to their use in electrolysers and electrochemical cells, e.g. fuel cells.

BACKGROUND OF THE INVENTION

In an electrolytic cell, the input of electrical energy results in a net chemical transformation. A common feature of conventional electrolytic cells is that a substantial input of electrical energy is required to drive the electrolytic reaction at a sufficient rate. This expenditure of electrical energy reduces the efficiency of the cell.

Electrochemical cells, and in particular fuel cells, may be in the form of a membrane electrode assembly (MEA). Solid polymer electrolyte fuel cell MEAs typically have a multi-layered structure comprising (i) a Proton Exchange Membrane (PEM), (ii) a current-collecting electrode, and (iii) an electro-catalyst layer on each side. A PEM operates by virtue of containing embedded cationic sites, allowing the transmission of anions. Equally, a solid polymer electrolyte may contain fixed anionic sites, and which is capable of preferentially transmitting cations. References to PEM below are thus not exclusive.

A structure as described above is assembled from discrete elements and bonded into an MEA by the use of heat and pressure, before being assembled between gas manifolds, the whole structure being sealed against gas leakage (and cross-over) to form a single cell. The process is complex and together with the inherent cost of the PEM and the catalyst-coated carbon paper usually used as items (ii) and (iii) represent the principal costs of production of a fuel cell.

A limitation on the performance of PEM fuel cells is water management, in order that the PEM membrane remains adequately hydrated while in use. The conversion of hydrogen and oxygen to electricity yields product water which appears at the oxygen electrode. If the membrane is to remain operational, the membrane must have sufficient water-permeability to redistribute the product water and prevent local drying-out of the membrane. Drying out leads to overheating and catastrophic failure (possibly even hydrogen/oxygen crossover with the potential for explosive failure).

PEM devices operate by virtue only of the properties built into the membrane. In use as an electrolyser, the addition of water and electricity yields oxygen and hydrogen; in use as a fuel cell, hydrogen and oxygen (or air) are used, and electricity results.

Existing PEM materials, e.g. Nafion, consist of a non-cross-linked fluorinated polymer (essentially PTFE) with pendent side-chains containing an ionically active site (normally $SO_3$). Hydrophilicity is provided by the $SO_3$ sites. These materials must be kept hydrated with additional water (supplied via hydrated fuel gas) to operate. They are available as thin sheets, 10-30 μm thick, for assembly into cells (voltage 1V) and thus into cell stacks (typically 100 units).

A stack may be produced from individual MEAs. Since each MEA has to be produced separately, and the stack built up in series, the production of a stack is laborious.

Hydrophilic polymers, capable of having a high water content, are known. The level of water content determines their properties. Their electrical properties are defined by the properties of the hydrating solution. For example, certain hydrophilic materials such as HEMA (2-hydroxyethyl methacrylate) and MMA-VP (methyl methacrylate-vinylpyrrolidone) are well known in the biomedical field as contact lens materials, but they possess no intrinsic electrical properties. Thus, if hydrated in deionised-distilled (DD) water, the resulting polymer is a good electrical resistor but, if hydrated in an acid or alkaline solution, the material is a good conductor until the electrically active solution washes out when the hydrated polymer reverts to a non-conducting system.

U.S. Pat. No. 4,036,788 discloses anionic hydrogels obtained by copolymerisation of a heterocyclic N-vinyl monomer, a sulphonic acid-containing monomer and a cross-linking agent. Polymerisation may be conducted in the presence of a water-soluble solvent in which the monomers are soluble; the polymer is obtained in the form of an organogel from which the non-aqueous solvent is removed by distillation, evaporation or washing with water. Immersion in water causes swelling, to give a soft, pliable material that can be used to recover basic or cationic materials from an aqueous medium, or for the controlled release of such materials.

WO-A-01/49824 discloses a polymer obtainable by polymerising a sulfo group-free monomer, a sulfo group-containing monomer and, optionally, a cross-linking agent. The polymers are useful for the attachment and growth of cells, and for biomedical devices and prostheses. They have a high expansion ratio.

Elements of this specification have been published before its priority date. See, for example, the Delegate Manual of the Fifth Grove Fuel Cell Symposium, 22-25 Sep. 1997. These elements do not provide sufficient information for one of ordinary skill to practise the invention described below.

SUMMARY OF THE INVENTION

The present invention is based at least in part on the discovery that ion-exchange membrane (IEM) materials, in particular PEM materials (but including cationic materials, as described above), can be produced based upon hydrophilic polymers (i.e. polymers inherently able to absorb and transmit water throughout their molecular structure). Such materials, modified to include sulphonic acid or other strongly ionic moieties, can be made by bulk polymerisation from an initial monomer or pre-polymer system by radiation or thermal polymerisation. Polymerisation should be conducted in the presence of water or another liquid such that the system is homogeneous.

According to a first aspect of the present invention, a partially pre-extended hydrophilic polymer, capable of further hydration with water, is obtainable by copolymerisation of monomers comprising: a monomer including a strongly ionic group; and solvent, e.g. a polar liquid. The resulting polymer is preferably cross-linked. A polymer or IEM material of the invention which is not hydrated with water can become hydrated (which for the purpose of this specification includes any degree of hydration, including maximum hydration) in use, e.g. in a fuel cell where water is produced.

The present invention also concerns a hydrophilic IEM material comprising a matrix of a hydrophilic polymer, and held within the matrix, a molecule including a strongly ionic group. An ionically active molecule may be held within the matrix by steric interference and/or chemical bonding. The polymer may be cross-linked.

The controlled introduction of electrically active sites results in materials that are both self-hydrating and electrically conducting in pure water. Such materials can be used as electro-chemical membranes, and also have properties that make them suitable for use in biosensors and electro-optical devices.

The ability to produce IEM materials, by polymerisation in situ, allows a one-step route for the production of stacks. Further, it is possible to produce a composite polymer-electrode system in which a polymer separator interpenetrates and extends the active surface area of the electrode or electrode catalyst system.

According to a second aspect of the present invention, a MEA for an electrochemical reaction comprises electrodes and an IEM, for example a PEM, wherein the assembly contains a defined channel for the transmission of a liquid or gaseous reaction component to and/or from an electrode. The assembly may also comprise a catalyst of the reaction, which preferably is in contact with the channel.

If each of two or more reactants is a liquid or gas, further channels may be provided. Each channel may be wholly or partially within the membrane; for example, it may be defined by the membrane and a surrounding matrix or support material.

BRIEF DESCRIPTION OF THE DRAWINGS

FIGS. 2A-2D respectively illustrate products of the invention having controllable system parameters.

FIGS. 9 and 10 are plots of cell voltage against current for products embodying the invention.

DESCRIPTION OF PREFERRED EMBODIMENTS

Figure 1A:
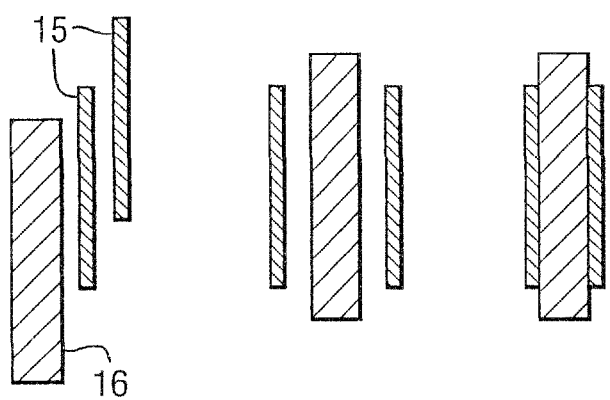
FIGS. 1A and 1B illustrate stages in known and new procedures, respectively, for preparing composite MEAs.

Hydrophilic copolymers can be formed by the polymerisation from solution of a monomer mixture typically comprising:
(a) a hydrophobic/structural comonomer such as MMA, AN (acrylonitrile), polyamide or TRIS, and
(b) a hydrophilic but not necessarily electrically active comonomer such as VP, HEMA, etc.

The presence of both hydrophilic and hydrophobic monomers allows control of the electrical properties separately from the hydraulic properties, as may be appropriate for the separate requirements of a membrane and the membrane/catalyst/electrode interface. The relative amounts of these monomers allow controlled swellability, and allow the product to be rigid, or solid and elastic.

Cross-linked materials may be formed by using γ-irradiation or thermal irradiation. For example, ionising radiation, e.g. 90 MeV gamma radiation from a Cobalt 60 source may be used, in which case no cross-linking agent needs to be added. Nevertheless, it is possible to control the properties of the final material by the addition of:
(c) a chemical cross-linking agent such as allyl methacrylate or ethylene glycol dimethacrylate, and
(d) a chemical initiator such as AIBN (azoisobutyronitrile) or azobiscyclohexanecarbonitrile.

If the material is to be thermally initiated and cross-linked, then components (c) and (d) above become essential to the process.

The present invention concerns the conversion of such hydrophilic materials to electrically active systems, cationic or anionic, by the addition of:
(e) an electrically active molecule held within the matrix of the hydrophilic polymer; or
(f) an electrically active comonomer.

The electrically active component can be based either upon an acid, e.g. a sulphonic acid ($SO_3$), phosphoric or phosphonic acid, or a base or alkali, e.g. a compound providing OH ions such as KOH, NaOH or ammonium hydroxide, or vinylbenzyltrimethylammonium chloride. The preferred monomer is 2-acrylamido-2-methyl-1-propanesulphonic acid (AMPS), styrenesulphonic acid (SA), vinylsulphonic acid (VA) or SOMA. It is also possible that component (a) or (b) may be modified so that it also functions as component (f).

An electrically active molecule (e) may be held within the matrix by steric interference as an alternative to, or in addition to, chemical bonding. Addition of a swelling liquid (e.g. ethyl alcohol) to the hydrophilic polymer can cause greater swelling than with water. Ionically active molecules dissolved in the swelling liquid will exchange for water by diffusion and the polymer will shrink, thereby entrapping the molecules within the matrix. Such an effect is observed with 50:50 MMVA-VP copolymer and ionic molecules dissolved in ethyl alcohol.

One or more types of ionically active molecules can be introduced into the matrix using this method. Subsequent activation of the material by gamma-irradiation may cause a reaction between introduced molecules, to form a molecule larger than those entrapped by steric interference, and/or a binding reaction of an introduced molecule with the polymer matrix.

In a solid polymer electrolyte as used in any form of PEM system, the ionic conduction ($C_i$) should be very much greater than the electronic conduction ($C_e$). A $C_e/C_i$ ratio of less than 0.1 is desirable for successful operation.

A product of the invention may be produced by polymerisation of the monomers and water or another liquid in which component (f) is soluble and with which the other components are miscible. The involvement of water is not fully understood, but as an acidic or alkaline solution it apparently acts as a comonomer and mediates the introduction of the acid or alkali moieties into the cross-linked polymer structure. After polymerisation, some or all of the water may be removed, but rehydration does not necessarily give the product obtained before drying.

Considerations that should be given to the materials include their hydrophilicity, for control of water and gas permeability independent of the electrical properties, and their cross-linking, for stability; the use of sulphonic acid, phosphoric acid, etc; the use of alkaline side chain for alkaline fuel cells; and the use of water or alcohol to carry the electrically active moiety into the polymer, the polar solution acting (unexpectedly) as a co-monomer. As the polymer, AN-VP plus AMPS is preferred, but other suitable monomer combinations include MMA-VP; MMA-HEMA; perm with AMPS<VSA<SSA<TSA etc;

In order to produce a consistent, homogeneous and isotropic polymer, the individual components should be soluble, one in another, or mutually miscible. By way of example, sulphonic acid-containing moieties are generally not soluble in other preferred comonomers. It has been found that an effective route to carrying the sulphonic acid component into the final monomer mixture is to dissolve the acid in water (or alcohol or other suitable polar liquid) and incorporate the solution into the monomer mixture. The ultimate $SO_3$ content (and therefore the electrical properties) depends upon, inter alia, the solubility of the sulphonic acid moiety in water, the ability of the other comonomers to be miscible with a given volume fraction of acid solution, and the stability of the resulting mixture and its ability to be polymerised.

It has been found that AN-VP systems are miscible with significant volume fractions of aqueous acid. An aqueous solution containing up to 50% of the final monomer mixture can be used effectively as a comonomer.

When exposed to gamma radiation, the monomer mixture may become viscous and then form a solid but elastic cross-linked mass, e.g. at total dosages of 0.1-3.0 Mrad.

As an alternative to polymerisation of the monomers directly to the desired polymer, a pre-polymer may first be formed, e.g. (i) by gamma irradiation using a low total dose (typically <0.05 Mrad, & dose rate ~0.01 Mrad/hour), or (ii) by UV irradiation in the presence of a suitable UV initiator, e.g. 2,2-dimethoxy-2-phenylacetophenone. The pre-polymer (which is relatively easy to handle) may then be converted to a final solid, cross-linked form by the subsequent use of (iv) additional gamma irradiation, e.g. to a total dose of 1.0-3.0 Mrad, or (v) thermal polymerisation in the presence of a suitable initiator, e.g. AIBN or azobiscyclohexanecarbonitrile.

The final materials are typically already partially pre-hydrated, containing significant water as an initial comonomer, and thus the expansion to full hydration does not result in the additional degree of expansion normally associated with IEM materials. This significantly reduces the hydration stressing and consequent delamination between the IEM and the catalyst/electrode structures which are normally associated with Nafion-based MEAs.

Some considerations that should be given to the polymerisation method include:
(a) the effect of temperature upon the polymerisation, e.g. using chemical initiators to avoid foaming, and/or using gamma irradiation when refrigeration of the monomer allows control of rheology and the solubility of any adjacent material;
(b) the use of one step, using thermal, UV or gamma radiation or the use of two steps via a pre-polymer using thermal/thermal; gamma/gamma; thermal/gamma; gamma/thermal or UV etc; and
(c) rheological control of the properties of the monomer mixture or pre-polymer to enhance the filling process and control wetting/penetration of the catalyst or electrode paper when used.

Considerations that may be given to the conversion/production of a membrane/MEA/cell stack include:
(a) the use of gamma-radiation, in one step from monomers;
(b) the use of thermal initiators, in one step from monomers to avoid bubbles;
(c) the use of two steps, via a pre-polymer for rheology control or special interface properties.

A "lost-wax process" (which includes the use of ice) may be used, e.g. to avoid flooding of manifolds. Shape-recovery polymers may be used for the manifold or the MEA. Peel-off coatings on the electrode mesh may be provided to define the "membrane".

It is desirable that the polymer used in this invention should exhibit maximum values of conductance and IEC at any given water uptake. The water uptake at equilibrium determines the volume expansion on hydration, and thus determines the mechanical properties and the likelihood that any resulting composite MEA will fail by delamination on hydration, or on a change of hydration.

Another desirable property of the polymer is that the water uptake, the electrical properties and the mechanical/hydraulic properties can be controlled independently. Preferred materials allow the IEC and conduction values to be controllably varied, e.g. by a factor of 2, while simultaneously controlling the water uptake over a range of 3 (from 30% to 85% by wet weight fraction).

An example of a suitable procedure for primary monomer selection comprises formulating samples using (AN or MMA or PA)+VP+(each of AMPS, VS, SA, and SOMA) in each of two sulphonic acid concentrations. These samples were prepared using allyl methacrylate as cross-linking agent and polymerised by gamma irradiation. They were screened for conductance in DD water, mechanical properties, and water uptake. By this process, the initial spectrum of possible formulations (24 in all) was reduced to the most preferred systems, based upon AN+VP+AMPS, which will be used below for the purpose of illustration only. The primary reasons for the selection of AN+VP+AMPS were firstly that the system demonstrated higher electrical conductance values than any other monomer combination, probably because of the excellent miscibility limits for the monomers and water-based solutions of the sulphonic acid(s), and secondly because of the mechanical properties. In all cases, the mechanical properties (tensile strength and tear strength) are functions of the equilibrium water uptake of the polymer (elasticity increasing and tensile strength decreasing with increasing water uptake), but the use of AN was found to provide the greatest tensile and tear strength as a function of water content.

As might be expected, the electrical properties when hydrated in DD water were found to be directly dependent upon the concentration of $SO_3$ sites in the polymer. In practice, the sulphonic acid moieties were not soluble in any of the primary monomers, and were introduced into the system by dissolving the material in water and adding that to the AN+VP mixture. The maximum limit of the $SO_3$ concentration was therefore established by the miscibility limits of water+$SO_3$+monomer before separation or deposition of the components occurred. A satisfactory limit could be achieved when using AN.

The equilibrium water uptake (in DD water) was found to depend upon three parameters: (a) the concentration of the primary hydrophilic entity VP; (b) the concentration of $SO_3$ which acted as a hydrophilic entity additional to and additive with the VP; and (c) the concentration of cross-linking agent allyl methacrylate (AMA). Equilibrium water uptake increased with increasing VP concentration, increasing $SO_3$ concentration, and decreasing cross-linker concentration.

Considerations that may be given to improving electrode/catalyst/membrane interfaces include:
(a) catalyst inclusion during polymerisation (integral catalyst);
(b) carbon fibre inclusion during polymerisation (integral electrode);
(c) composite catalyst/electrode inclusion in the membrane;
(d) the use of extended surfaces, which may allow optimisation of the catalyst/electrode/ionomer surface differently on each side of a fuel cell or an electrolyser.

As indicated above, the present invention allows the production of composite structures (comprising electrode-catalyst-membrane-catalyst-electrode) by a one-step process. This represents a significant departure from any existing production route. If an existing carbon paper electrode-catalyst is used, the monomer or pre-polymer system may soak into it and reduce the gas transmission to the catalyst layer; in order to reduce any adverse effects, the paper-based material should be as thin as possible, e.g. ETEK TPGH-030 carbon paper containing 0.35 mg/cm$^2$ platinum.

Figure 1B:
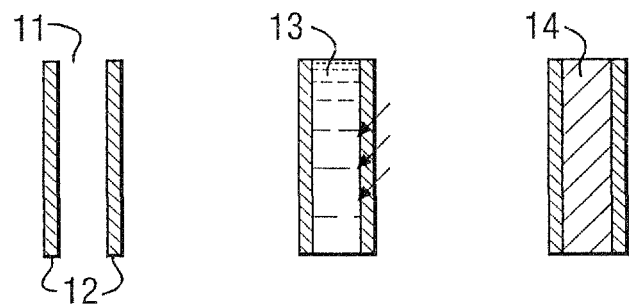

Production of a single composite fuel cell unit preferably comprises the construction of the catalyst-coated two electrode system assembly as a "mould", leaving a gap for the membrane, and the introduction of the "membrane" as a polymer/pre-polymer, after which a single irradiation process completes the production process. This is shown diagrammatically in FIG. 1B which shows, in order, a cavity 11 between catalyst-electrodes as walls 12; the filling of the cavity with hydrophilic monomer liquid 13 and its irradiation; and the resulting polymerised "membrane" 14, forming an integral cell in one stage. This should be compared with the convention of procedure, shown in FIG. 1A, which comprises, in order, the separate obtaining-catalyst to electrodes 15 and PEM material 16; assembly and alignment of the materials; and sealing, heating and compressing to make catalyst-electrode contact.

Because the materials are polymerised from solution (or pre-polymer), they offer a number of alternative production routes. For a finished membrane, they include:
(a) using a fibre reinforcement (1D or 2D), to control 1D or 2D expansion on final hydration;
(b) un-reinforced but biaxial pre-stressing, to control expansion and prevent delamination when assembled in contact with the catalyst/electrode structures;
(c) incorporating a catalyst and/or a carbon fibre into the surface layers, to form a chemically active and electrically conducting gas interface, effectively a finished MEA but not dependent upon conventional catalyst/electrode structures; and
(d) casting the polymer surface against a "textured" surface, to produce a polymer/catalyst reactant surface of extended surface area and possibly enhanced performance.

Reference should be made to FIG. 2: FIG. 2A shows a simple polymer 21 of the invention; FIGS. 2B and 2C show the polymer with distributed catalyst 22, single- and double-sided; and FIG. 2D shows additionally an electrode 23. The electrode may be wholly or partially impregnated with the hydrophilic material.

For a finished MEA using conventional catalyst electrode paper, routes include:
(a) a one-step process from monomers using gamma irradiation, as shown in FIG. 1;
(b) a one-step process from monomers using thermal initiators; and
(c) a pre-polymer stage for rheology control or special interface properties.

For a composite MEA, wherein the membrane is formed in situ in the space between (and thus in contact with) the catalyst and electrode elements one-step routes include:
(a) polymerisation of a liquid monomer or pre-polymer;
(b) polymerisation of a monomer or pre-polymer in solution in a suitable carrier;
(c) a solution polymerisation process;
(d) casting a liquid polymer in solution, with extraction of solvent to deposit the polymer;
(e) introduction of a suitable polymer as a powder, the powder being compressed or sintered; and
(f) introduction of a suitable polymer in its melted state, the material solidifying when the MEA is returned to normal operating temperature.

These processes for producing a MEA are not limited to plane parallel systems. A composite membrane material formed by method (e) may be impregnated with a material which provides or improves the ion transport and/or hydraulic properties. The impregnant may be effective as introduced, or after it has been polymerised, cross-linked or gelled with the membrane material. A composite MEA may also be manufactured by combining two single-sided "half" cells within the thickness of the membrane. This can be achieved by using an additional polymerisation process.

For a finished multi-cell stack, routes of production include any of methods (a) to (g) for a composite MEA, and also:
(a) a one-step process from monomers using gamma irradiation, as shown in FIG. 1;
(b) a one-step process from monomers using thermal initiators; and
(c) a two-step process via pre-polymers for rheology control or special interface properties.

Again, the process is not limited to plane parallel systems.

In preparing a multi-cell stack, it may be desirable to prevent the monomers flooding the gas manifold structure (which would prevent the cell stack from operating). As an alternative to the use of a conventional blocking material, a pre-stressed hydrophilic material may be used to block the manifold passages, a material which will recover to a shape which can be removed (sintered powder or shape change). Alternatively, a "smart" recovery material metal or plastics could be used to construct the manifold itself. The cell may be made and filled with monomer, and polymerised to form the membrane, after which the manifold material is activated to regenerate the gas passages.

A membrane of a MEA device may comprise a matrix of a hydrophilic polymer which is electrically inactive, but which contains a strongly ionic species held in the matrix; this confers overall electrical activity to the membrane material.

For the purpose of illustration, a composite MEA may be formed between two smooth PTFE plates, the separation between the electrodes being maintained using a porous polyester interlayer in either woven or non-woven form, chosen to be inert with respect to the monomers used. The monomer mixture is then introduced into the gap (under nitrogen atmosphere), filling the separator material, and the cell is compressed to define the thickness of the structure. The mould is placed in an excess of monomer and irradiated, e.g. by a two-stage process (low dose/dose rate then high dose rate to completion).

The polyester layer maintains the separation of the two paper electrodes during filling and polymerisation. Further, because normal hydrophilic materials expand isotropically on hydration, the introduction of such a reinforcement is extremely effective in controlling the area expansion of the hydrophilic polymer membrane on hydration. Thus, although the material expands, the effect is to increase the thickness of the reinforced membrane rather than its area. This is effective in preventing delamination of the composite system during hydration, prior to clamping and restraint between the plates of the fuel cell test apparatus.

This production route provides a composite electrode-membrane-electrode structure interpenetrated with membrane material which, when extended beyond the area of the electrodes, forms an effective gas seal when clamped between the manifolds of a fuel cell test apparatus.

Bubbles may form within the composite (normally within the polyester reinforcement). This problem may be minimised by ultrasonicating the mould after filling, and by using the two-stage polymerisation process which serves to minimise the temperature rise during polymerisation. MEA's may be fully hydrated and tested prior to installation in a fuel cell, using nitrogen to ensure that there is no possibility of gas cross-over.

In the second aspect of the invention, the presence of transmission passages in the assembly allows a reaction component to come into more effective contact with the electrode(s) and also with any catalyst. The passages may be created by "lost wax" or "smart material" insertions cast into the membrane, and are preferably circular in cross-section. The assembly may also comprise discrete manifold structures which define its physical limits, and a passage may be both embedded into the membrane and into the assembly's physical limits. The electrode and any catalyst materials may be coated in the reactant passages after their formation, or cast into a passage surface during a "lost wax" or "smart material" process.

A flexible material, e.g. of a plastics material, may be used to define the edge of the MEA and to provide electrical and/or gas separation. A carbon fabric may be used as an electrode, and the fabric may be impregnated with a layer of catalyst. In a fuel cell, where the reactants are hydrogen or oxygen, the catalyst is typically platinum. Similarly, an electrolyser for the electrolysis of water generally comprises a platinum electrode. When an electrode is self-supporting or supported by a "lost wax" structure, then multiple cells can be cast, as the membrane itself forms the structure within which the cells are formed.

The membrane material preferably comprises a polymer which includes a strongly ionic group, as described above.

Figure 3:
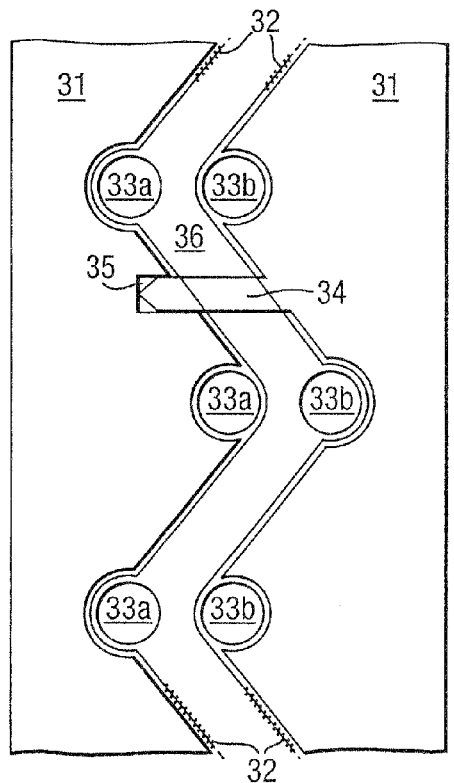
FIGS. 3-5 illustrate schematically embodiments of the second aspect of the invention.
Figure 4:
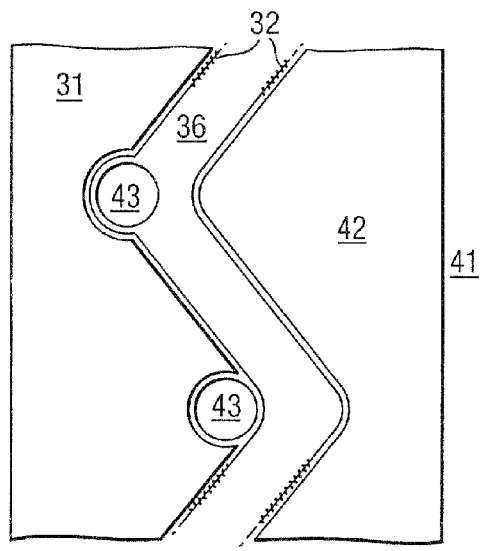
Figure 5:
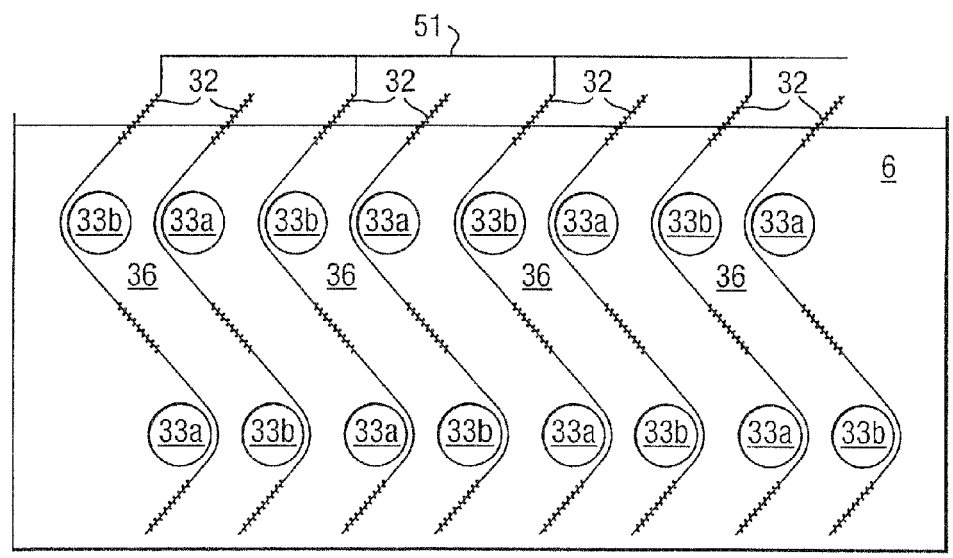

Embodiments of the present invention, containing a channel, are shown in FIGS. 3 to 5. The features common to each of these embodiments are an electrode 32 (typically of carbon fabric, impregnated with a layer of catalyst), and a cast ion-exchange membrane 36.

FIG. 3 depicts an assembly wherein a flexible plastics material 31 (e.g. polyethylene) is used to define the edge of the assembly, with the separation defined by a protrusion 34 of one boundary into a corresponding recess 35 in the opposed boundary. The reactants are separately transmitted through channels 33a and 33b; one reactant is fed through channels 33a, the other through channels 33b. The staggering of the pairs of channels 33a and 33b results in an increased electrode surface area compared to that of conventional flat electrode assemblies.

FIG. 4 shows an assembly wherein the reactant is oxygen in atmosphere 41. In this case, one of the bounding members shown in FIG. 3 has been replaced by a gas-permeable material 42, to enhance transmission of oxygen to the reaction interface. The other reactant is transmitted through channels 43.

FIG. 5 shows electrodes 32 supported by a "lost wax" structure. The reactants are fed through channels 33a and 33b as in FIG. 3. In this example, four individual cells are cast into the membrane, the membrane regions between individual cells defining three additional cells. If the assembly is a fuel cell, then the output current from cell connection 51 is equivalent to that of seven individual cells.

The following Examples illustrate the invention.
Abbreviations and materials used herein are:
Hydrophobic Monomers:
  methyl methacrylate (MMA)
  acrylonitrile (AN)
  methacryloxypropyltris(trimethylsiloxy)silane (TRIS)
  2,2,2-trifluoroethyl methacrylate (TRIF)
Hydrophilic Monomers:
  methacrylic acid (MA)
  2-hydroxyethyl methacrylate (HEMA)
  ethyl acrylate (EA)
  1-vinyl-2-pyrrolidinone (VP)
  propenoic acid 2-methyl ester (PAM)
  monomethacryloyloxyethyl phthalate (EMP)
  ammonium sulphatoethyl methacrylate (SEM)
—$SO_3H$ Moieties:
  toluenesulphonic acid (TSA)
  1-methyl-1-benzimidazole-2-sulphonic acid
  isethionic acid, Na salt
  1-hexanesulphonic acid, Na salt
  hydroxylene-O-sulphonic acid
Monomers Containing Sulphonic Acid Sites for Copolymerisation:
  2-acrylamido-2-methyl-1-propanesulphonic acid (AMPSA)
  vinylsulphonic acid (VSA)
  styrenesulphonic acid (SSA)
  2-sulphoethyl methacrylate (SOMA)
  3-sulphopropyl methacrylate, Na salt (SPM)

EXAMPLE 1

Materials
  Acrylonitrile-vinylpyrrolidone (AN-VP; 1:1) mixture monomer was purchased purified and used as bought.
  Methyl methacrylate (MA) (99% Aldrich) was distilled before use.
  1-Vinyl-2-pyrrolidinone (VP) (99% Aldrich) was frozen and used on defrosting.
  Cross-linking agent used was allyl methacrylate (AMA) (98% Acros).
  2-Acrylamido-2-methyl-1-propanesulphonic acid (AM) (99%), vinylsulphonic acid (sodium salt, 25 wt % solution in water) (VSA) and 4-styrenesulphonic acid (SSA), sodium salt hydrate, were all purchased from Aldrich.
  Sodium sulphopropyl methacrylate was synthesised according to U.S. Pat. No. 1,299,155.
Formulations
  Eight different solutions of various compositions of AM, AMA and AN-VP in deionised water (DDW) were made up, as shown in Table 1.

TABLE 1

| Sample | AM | % | DDW | % | AMA | % | AN-VP | % | Total |
|---|---|---|---|---|---|---|---|---|---|
| OR | 30 | 14.15 | 30 | 14.15 | 2 | 0.94 | 150 | 70.8 | 212 |
| 1-1.5AOR | 3 | 18.6 | 3 | 18.6 | 0.13 | 0.82 | 10 | 62 | 16.13 |
| 2-1.5A6X | 3 | 17.86 | 3 | 17.86 | 0.8 | 4.75 | 10 | 59.5 | 16.8 |
| 3-1.5A8X | 3 | 17.58 | 3 | 17.58 | 1.06 | 6.24 | 10 | 58.6 | 17.06 |
| 4-1.5A10X | 3 | 17.31 | 3 | 17.31 | 1.33 | 7.67 | 10 | 57.7 | 17.33 |
| 5-2aOR | 4 | 22.06 | 4 | 22.06 | 0.13 | 0.73 | 10 | 55.2 | 18.13 |
| 6-2A4X | 4 | 21.58 | 4 | 21.58 | 0.53 | 2.87 | 10 | 54 | 18.53 |
| 7-2A8X | 4 | 20.98 | 4 | 20.98 | 1.06 | 5.58 | 10 | 52.5 | 19.06 |
| 8-2A10X | 4 | 20.69 | 4 | 20.69 | 1.33 | 6.88 | 10 | 51.7 | 19.33 |

Preparation of Monomers for Radiation Polymerisation

The various sulphonic acids were dissolved in distilled water before adding them to AN-VP (1:1). AMA was then added to the mixture and stirred. The solutions were either dispensed into aluminium cells lined with PTFE and sealed or into a container with plastic plates.

The monomers were introduced into the cell with the bottom plate flat on the surface and filled from the top until the monomer reached the top. The top plate was then placed over the filled bottom plate and G clamps were used to secure the two plates together. The plates were then placed upright in an ultrasonic bath to get rid of bubbles in the system, for 30 min, before exposure to gamma radiation, in the upright position. A MEA was made in situ by placing a piece of nonwoven material saturated with monomer in between two electrodes between two plates before irradiation.

Irradiation Details

Single-step irradiation was conducted for 20 hours, at a dose rate of 0.125 Mrad/hr, to a total dose of 2.50 Mrad.

Two-step irradiation was also used. When the formula was OR, initial irradiation was for 29 hours at 0.01 Mrad/hr (=0.29 Mrad), followed by a second dose, for 80 hours at 0.03 Mrad/hr (=2.40 Mrad). Where the formula was 1.5 OR, the first dose was for 20 hours at 0.01 Mrad/hr (=0.25 Mrad), and the second dose for 6.83 hours at 0.03 Mrad/hr (=1.7075 Mrad).

During this irradiation, as the sample was so close to the source, the container was turned through 180° approximately halfway through. This irradiation was slightly lower than that normally given to previous samples, at ca. 2.5 Mrad.

Water Uptake

Sections of the membrane were immersed in deionised water for 24 h at room temperature, dried with blotting paper to remove surface water and weighed. The membranes were then dried in a vacuum oven at 60° C. to constant mass. The water uptake may be determined using $[(M_h-M_d)/M_h] \times 100\%$, where $M_h$ and $M_d$ are the masses of the hydrated and dried membrane, respectively.

Ion Exchange Capacity Measurement

Samples of the membrane were hydrated in HCl (0.1M) (50 ml) solution at ambient temperature for 24 h. The samples were then blotted dry with tissue and placed in NaOH (0.1M) (50 ml) and allowed to exchange for 24 h. Three aliquots (10 ml) of this NaOH solution were then titrated against HCl (0.1M). Phenolphthalein was used as the indicator. The samples were then tissue-dried again, and placed back into HCl (01.M) (50 ml) overnight before the samples were placed in a vacuum oven at 110° C. for 8 hours and cooled in a desiccator.

IEC was calculated as follows:

Molarity of NaOH after exchange=[(Molarity of HCl)×average Titre]÷10

Change in Molarity $(X)$=(Molarity of NaOH before exchange)−(Moiety of NaOH after exchange)

100 ml contains $(X)$ mols $Na^+$
50 ml contains $(X/1000) \times 50$ moles $Na^+ = Y$
$Y$ moles $Na^+$ ions were exchanged with $Z$ grams dry membrane $$\frac{Y}{Z} = \text{moles } Na^+ \text{ per gram}$$

$$= \frac{Y}{Z \times 1000} \text{ A milliequivalents per gram dry membrane}$$

Resistance Measurements Under Different Conditions and Conductivity

Resistance of the hydrated membrane was measured in a cell at room temperature using a Phillips Model PM 6303 RCL resistance meter. The samples were tissue-dried then coated with a thin layer of electrode gel and placed between the dried electrodes which were also coated with a thin layer of electrode gel. Its conductivity was then calculated from its thickness and area (1 cm×1 cm).

Resistance of hydrated samples (1.8 cm diameter discs; 2.54 cm$^2$) was also measured using a Solarton SI 1260 Impedance Analyser.

Materials that embody the invention have been tested for:
(a) equilibrium water uptake by gravimetric means, and by measuring the linear expansion ratio of samples of known dry size;
(b) gas permeability using a co-axial oxygen probe designed for use with bio-medial membranes (ISO 9913 Part 1). Although a well-established method for conventional hydrophilic materials, sulphonic acid-containing materials make accurate measurements difficult. However, gas transmission values within 15% of the values for conventional hydrophilic materials of comparable water uptake were established and are considered reasonable in view of the difficulties of measurement;
(c) thermal conductivity, measured in the fully hydrated state using the rapid transient thermal conductivity measuring apparatus described in ERA Report 5231 (1969) by G. Mole. The conductivity values were found to be a function of water uptake, increasing from 0.45 W/m.K for a material of 55% water uptake (equivalent to 78% of the conductivity of water) to 0.58 W/m. K for a material of 85% water uptake (equivalent to 95% of the conductivity of pure water);

(d) ion exchange capacity, carried out on (i) samples of material made as blocks and irradiated in parallel with the membrane materials, and (ii) samples of membrane material taken from the 'surplus' material beyond the MEA proper (see below). Samples of the material were hydrated in HCl (0.1M) solution for 24 hours. The samples were then placed in NaOH (0.1M) for a further 24 hours to exchange, and the resulting NaOH solution titrated against HCl.

(e) thermal stability, using thermal gravimetric analysis (TGA) and wash out on hydration. The materials were found to be remarkably stable on heating when compared with Nafion: the AN-VP-AMPS copolymer losing only 4% of its mass at 150° C. (comparable with Nafion) while retaining a remarkable 42% even at 800° C. (the residue for Nafion 0 at temperatures above 500° C.).

In order to evaluate conductance and IEC values, an additional sample of the monomer mixture used in the MEA was irradiated during the production of the MEA. The AN-VP-AMPS materials were found to have IEC values in the range 2-3, depending upon the precise manufacture route, corresponding to an equivalent weight in the range of 300-400. This compares very favourably with Nafion, for which the IEC was 0.91 and the equivalent weight 1100.

The MEA's were fully hydrated in DD water and installed in the cell using the periphery of the membrane itself as the pressure seal. Thus the installation of the MEA's was unusually simple and a stable open circuit voltage (OCV) was available within 30 seconds of applying the working gases. The test procedure involved setting the current (via an electronic load) and measuring the resulting cell voltage. The OCV was re-measured at the end of each test sequence to ensure that the MEA had not suffered serous problems of de-lamination or degradation during the trial.

Figure 6:
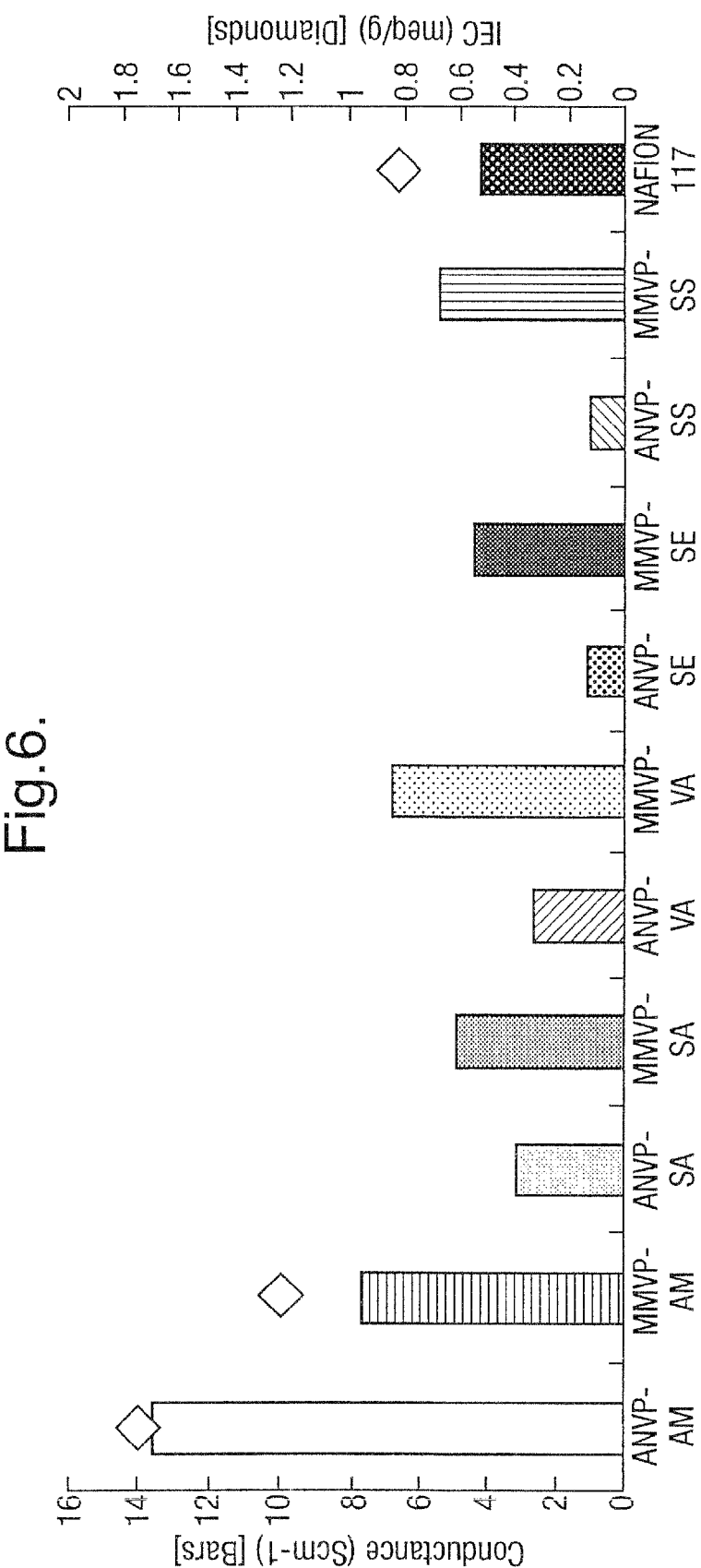
FIG. 6 is a plot of conductance and IEC as functions of polymer composition.
Figure 7:
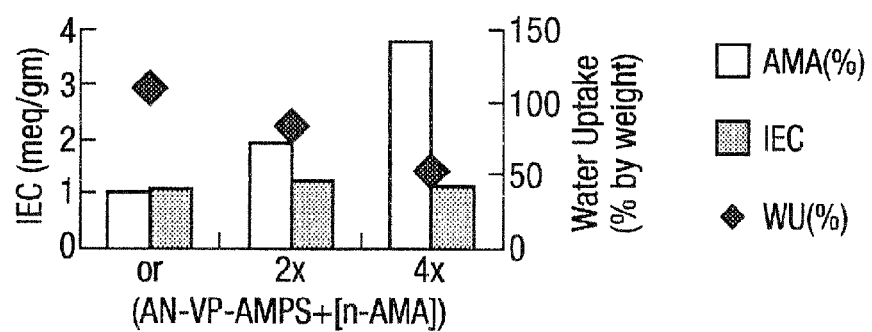
FIG. 7 is a plot of IEC and water uptake as functions of cross-link density.

In summary, materials have been formulated using vinyl-SA, styrene-SA, and most importantly 2-acrylamido-2-methyl-1-propane-SA, and the conductivities have been found to be comparable with or better than Nafion, as shown in FIG. 6. In addition, the use of cross-linking agents allows the final water uptake to be controlled separately from the electrical properties, as shown in FIG. 7.

Because the expansion ratio and the mechanical and hydraulic properties all depend strongly upon the water uptake on hydration, the control of the parameters set out above proved very effective in allowing the properties of the resulting materials to be determined and reproducibly controlled. This is shown in FIG. 7, where the IEC values for a range of polymer formulations based upon AN+VP+AMPS are plotted as functions of equilibrium water content and amount of AMA used. It is clear that it is possible to provide a material of a given IEC value over a wide range of water uptake (and therefore of expansion ratio, mechanical properties and water permeability), if so required by any specific application.

Figure 8:
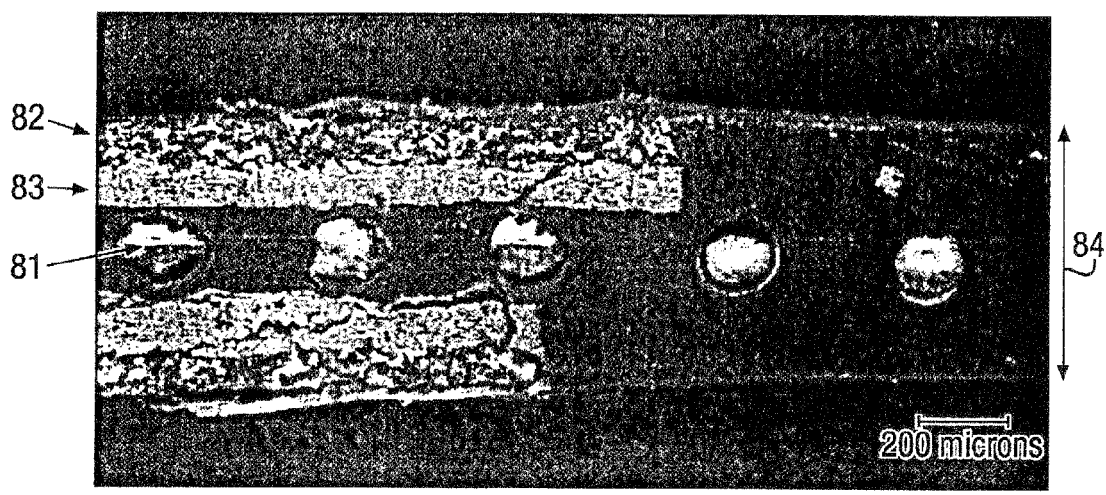
FIG. 8 is a cross-section of a product embodying the invention.

FIG. 8 is a SEM photo of a cross-section through the edge of a composite MEA in the dry state, showing reinforcement 81, two electrode papers 82, catalyst 83 and membrane material 84 extending beyond the electrode area to provide an integral gas seal.

The results shown in FIG. 9 (using a non-woven separator) and in FIG. 10 (using a woven separator) clearly demonstrate that the composite MEA's made by the single-step production process were operating effectively as PEM systems. The dotted line in each case shows the result of an MEA constructed conventionally but using an AN-VP-AMPS membrane, i.e. by simply compressing a plain membrane between electrode papers. The full line is the characteristic measured for the same membrane material constructed as an integrated MEA. The improved performance is a clear indication of the excellent contact made between the PEM material and the catalyst. The OCV was found to recover to its original value after repeated cycling (while fully hydrated), indicating that the process had been successful in preventing delamination of the polymer from the catalyst layer and carbon paper electrode material. An increase in membrane resistance was observed to accompany drying, although this was reversible on rehydration.

EXAMPLE 2

Materials

| | |
|---|---|
| Acrylonitrile (distilled) | 75 g (35.38%) |
| Vinylpyrrolidone | 75 g (35.38%) |
| 2-Acrylamido-2-methyl-1-propanesulphonic acid | 30 g (14.15%) |
| Water (HPLC grade) | 30 g (14.15%) |
| Allyl Methacrylate | 2 g (0.94%) |

Mixing

1. The acrylonitrile and vinylpyrrolidone are mixed together and stored in a sealed container.
2. The acid is slowly added to the water. The mixture requires continuous stirring to ensure complete dissolution of the acid. This process may take up to twenty minutes.
3. The mixture resulting from Stage 2 is slowly added to the mixture resulting from Stage 1. It is important that the acrylonitrile-vinylpyrrolidone mixture is chilled in a cold water bath during this process as some heat may be generated with the initial addition of the acid-water mix. It is also important to continuously stir the mixture during this process to avoid a sudden exotherm.
4. The allyl methacrylate is added to the mixture resulting from Stage 3 and well stirred.

The final mixture can be stored in a freezer for up to three weeks without any noticeable effect on its ability to polymerise.

Assembly

For each cMEA, two appropriately sized pieces of carbon paper electrode are placed on opposite sides of a thin non-woven polyester sheet. The carbon paper pieces must completely overlap and have their platinised surface in towards the polyester sheet. The role of the polyester sheet is two-fold. Firstly, it prevents the carbon paper electrodes from making contact with each other and shorting out; secondly, it controls the swelling behaviour of the resulting cMEA on hydration. Thin polyethylene sheet is used as a partition on both sides, enabling multiple cMEA's to be manufactured in one shot. Single or multiple cMEA's are placed in a sealable polyethylene bag.

The monomer mixture is introduced into the bag from a syringe coupled to a thin polyethylene tube, the end of which is positioned at the bottom of the bag. Prior to filling, the whole assembly is evacuated and flooded with nitrogen to remove atmospheric oxygen from the system. Introducing the monomer mixture directly to the bottom of the bag assists the removal of bubbles. The filling tube is removed and the bag is left to stand for five minutes, to enable the monomer mixture to penetrate into the separator material. Finally any air bubbles are worked out by gently squeezing the bag and sweeping them up and out of the liquid. At this point the bag is sealed.

External pressure is applied to the bag via two rigid polyethylene plates which are secured tightly together. This squeezes the assembly together, ensuring the carbon paper electrodes are held in position and that the resulting cMEA's are as thin as possible and of uniform thickness. Any excess monomer mixture pressed out from the cMEA's forms a reservoir at the top of the bag which is under some positive pressure.

Polymerisation

The assembly is subjected to a two-stage γ irradiation treatment as outlined in Table 2.

TABLE 2

| Stage | Duration (hrs) | Dose Rate (Mrad/hr) | Dose (Mrad) |
|---|---|---|---|
| A | 29 | 0.01 | 0.29 |
| B | 80 | 0.03 | 2.40 |
| | | Total Dose: | 2.69 |

The assembly is placed horizontally, with the "top" of the bag containing the excess monomer positioned furthest away from the source. The distance of the centre of the assembly away from the γ source is determined by the dose rate. When the dose rate is increased, the assembly is moved closer to the source but the orientation is unchanged.

Polymerisation is an exothermic process, which effects a volume reduction of about 4%. The initial low dose rate is optimised to polymerise the monomer mixture slowly without overheating. The second higher dose ensures complete polymerisation.

The parts of the cMEA's closest to the y source will be subjected to a higher dose rate than the excess monomer. It is intended that polymerisation will be initiated at one end in this way so that the excess monomer mixture can act as a make-up reservoir to compensate for the decrease in volume associated with this process. This method is believed to reduce the likelihood of void formation within the cMEA's during polymerisation.

Polymerisation may also be initiated thermally. This requires the addition of a suitable initiator (such as AIBN) to the monomer mixture. The quantity of initiator required is typically 2% of the weight of the AN-VP mixture (i.e. 3 g for the quantities listed above).

Such a mixture will polymerise over a number of days at room temperature. Increasing the temperature of the system can reduce this time. Initiation of polymerisation in the centre of the assembly may reduce the likelihood of void creation in key areas due to volume shrinkage on polymerisation. This can be achieved by the application of a point heat source in the centre of the top of the assembly.

Separation and Hydration of cMEA's

The polyethylene bag is cut open, and the assembly of cMEA's is removed. The cMEA's can be readily peeled away from the polyethylene partitions. However, monomer mixture may have seeped around the edges of the partitions and polymerised, bonding them together. In this case, cutting this region away from the edges makes for much easier separation. Care must be taken not to bend the cMEA's on removal, as the carbon paper electrodes are quite brittle.

Once separated, the cMEA's may be placed in separate sealable polyethylene bags with some deionised water. The bags must be large enough to allow for the expansion of the cMEA's during hydration.

The polyester separator material restrains the lateral expansion of the cMEA during hydration, causing most of the volume increase to be taken up by an increase in thickness. This has the benefit of reducing stress at the carbon paper-membrane interface, minimising any likelihood of delamination.

Testing of a CMEA as a Fuel Cell

A cMEA may be evaluated as a fuel cell in a system suitable for a single MEA. The fundamental components of such a system used in this case are:

1. Two graphite manifolds, the area of which is larger than that of the cMEA. Both manifolds have gas channels machined into one side, the area they cover being equal to the area of the carbon paper on the cMEA. With an MEA clamped between the manifolds, the assembly is referred to as a fuel cell.
2. Appropriate piping coupling hydrogen and oxygen of controllable pressure to the gas channels of respective manifolds.
3. A voltmeter in parallel to the fuel cell.
4. An electronic load in parallel to the fuel cell that is capable of drawing a user-defined current.

It is important that the cMEA is appropriately positioned between the manifolds so that the gas channels on both manifolds overlap the carbon paper. The manifolds are clamped together via a bolt in each corner. The membrane that extends beyond the carbon paper forms a gas seal with the manifolds as the cMEA is of uniform thickness (unlike conventional MEA's that require additional sealing mechanism(s)).

Figure 11:
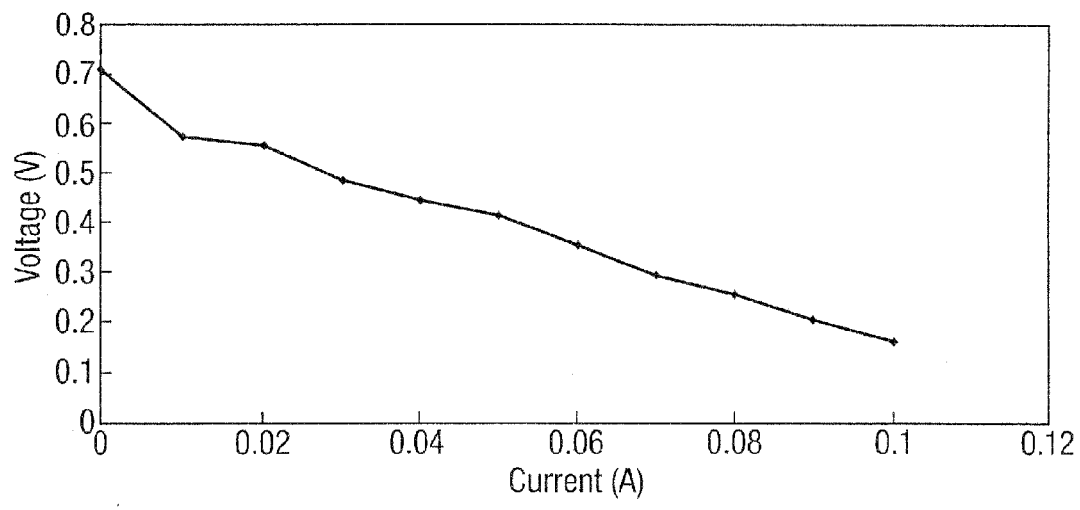
FIG. 11 shows the polarisation behaviour of a cMEA embodying the invention and operating as a fuel cell.
Figure 12:
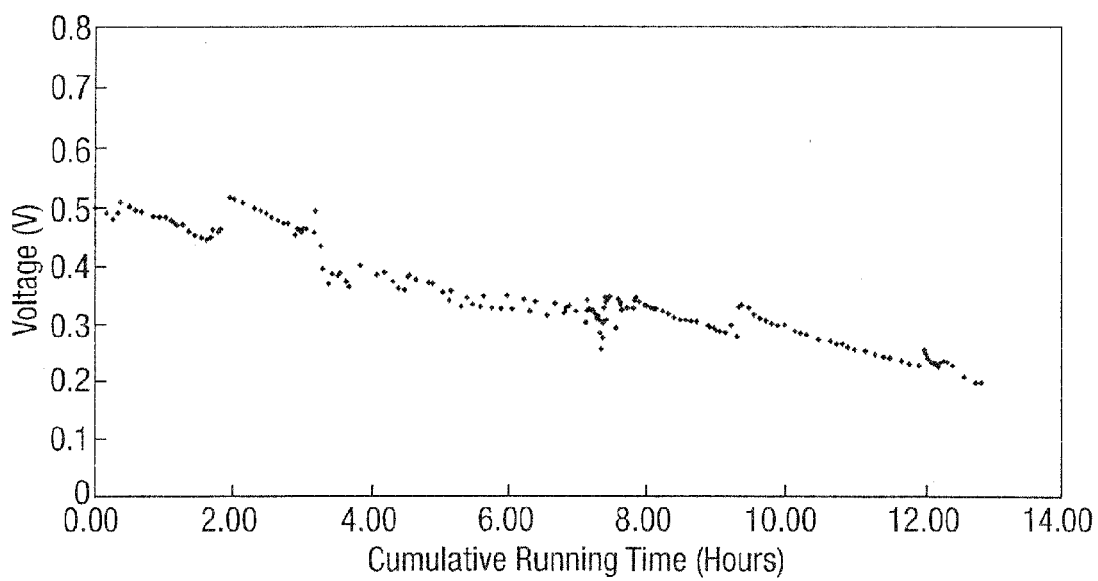
FIG. 12 is a plot of voltage against running time for a cMEA embodying the invention and running as a fuel cell at a constant current of 10 mA.

When hydrogen and oxygen are supplied to opposite sides of the cMEA, a voltage is observed. By activating the electronic load, increasing current can be drawn from the fuel cell and plotted against cell voltage to determine the polarisation characteristics of the cMEA. The results are shown in FIG. 11. FIG. 12 shows further results.

Testing of a cMEA as an Electrolyser

With the cMEA secured in between the two manifolds as it was for testing as a fuel cell, nitrogen was flushed through the gas channels to remove any residual hydrogen and oxygen. Capillary tubes were coupled to the gas inlet and outlet ports on both manifolds and water introduced to flood the gas channels. On application of a voltage (2.5 V) across the manifolds, gas was seen bubbling up through the capillary tubes from the gas channels of both manifolds. It was observed that more gas appeared to be generated from the manifold coupled to the negative side of the power supply. This is consistent with the evolution of hydrogen at the negative electrode and oxygen at the positive electrode owing to the stoichiometry.

A sample of the gas generated at the negative electrode was collected with a syringe and passed through a Drager tube designed for the identification of hydrogen. The result was positive, proving that the cMEA can function as an electrolyser to generate hydrogen and oxygen when subjected to a voltage.

The cMEA was then returned to the fuel cell test rig, and run for a further 15 hours. Evaluation suggested that the running of a CMEA as a fuel cell may be enhanced by pre-treatment as an electrolyser.

EXAMPLE 3

The procedure exemplified above was repeated, but using vinylbenzyltrimethylammonium chloride (BV) instead of AMPSA, thereby introducing cationic sites.

This material has been tested and found to have a significantly higher conductivity than Nafion (a 30% increase) when measured in the same test apparatus under the same conditions.

The material components are shown in Table 3.

TABLE 3

| AN (g) | VP (g) | X (g) | BV (g) | AMPSA (g) | Water (g) | Z (g) |
|---|---|---|---|---|---|---|
| 18.75 | 18.75 | 0.5 | 7.5 | 0 | 7.5 | 0.75 |

I claim:

1. A method for producing a membrane electrode assembly comprising electrodes and an ion-exchange membrane, wherein said method comprises:
   introducing in a space between the electrodes a material or materials from which the ion exchange membrane is formed, wherein the material or materials comprises monomers having ionic sites; and
   forming the ion exchange membrane in situ in the space between the electrodes by free-radical polymerisation, thermal polymerisation, or polymerisation by irradiation,
   wherein the ion exchange membrane comprises a matrix of a polymer,
   wherein the matrix comprises ionic sites directly fixed within it by chemical bonding, and
   wherein the fixed ionic sites are introduced from the monomers.

2. The method, according to claim 1, wherein the forming of the ion exchange membrane comprises in situ polymerisation of the monomers or a pre-polymer comprising the monomers.

3. The method, according to claim 2, wherein the polymer is a hydrophilic polymer including an ionic group.

4. The method, according to claim 1, wherein the membrane electrode assembly is in the form of an electrochemical cell.

5. The method, according to claim 1, wherein forming the ion exchange membrane in situ comprises subjecting the material or materials from which the ion exchange membrane is formed to irradiation while the material or materials from which the ion exchange membrane is formed is between the electrodes.

6. The method, according to claim 2, wherein in situ polymerisation of the monomers or the pre-polymer comprises subjecting the monomers or the pre-polymer to irradiation while the monomers or the pre-polymer is between the electrodes.

7. The method, according to claim 1, wherein the polymer is a solid polymer electrolyte.

8. The method, according to claim 4, wherein the electrochemical cell is a fuel cell.

9. The method, according to claim 4, wherein the electrochemical cell is an electrolyser.

10. The method, according to claim 2, wherein the polymerisation is free-radical polymerisation.

11. The method, according to claim 2, wherein the polymerisation is polymerisation by irradiation.

12. The method, according to claim 2, wherein the polymer is a solid polymer electrolyte, and wherein the polymerisation is free-radical polymerisation.

13. The method, according to claim 2, wherein the polymer is a solid polymer electrolyte, and wherein the polymerisation is polymerisation by irradiation.

* * * * *

UNITED STATES PATENT AND TRADEMARK OFFICE
CERTIFICATE OF CORRECTION

PATENT NO. : 9,447,217 B2
APPLICATION NO. : 11/957075
DATED : September 20, 2016
INVENTOR(S) : Donald James Highgate Page 1 of 1

It is certified that error appears in the above-identified patent and that said Letters Patent is hereby corrected as shown below:

On the Title Page

Item (62) Related U.S. Application Data should read --

Division of application No. 10/236,665, filed on Sep. 6, 2002, now Pat. No. 7,318,972.

Signed and Sealed this
Tenth Day of January, 2017

Michelle K. Lee
*Director of the United States Patent and Trademark Office*